(12) United States Patent
Geidl et al.

(10) Patent No.: US 7,039,234 B2
(45) Date of Patent: May 2, 2006

(54) ELECTRONIC INK AS A SOFTWARE OBJECT

(75) Inventors: Erik M. Geidl, Bellevue, WA (US); Robert A. Dain, Redmond, WA (US); Donald D. Karlov, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 935 days.

(21) Appl. No.: 09/909,416

(22) Filed: Jul. 19, 2001

(65) Prior Publication Data

US 2003/0053084 A1   Mar. 20, 2003

(51) Int. Cl.
*G06K 9/00* (2006.01)
(52) U.S. Cl. ..................................... 382/187
(58) Field of Classification Search ................ 382/165, 382/186–189, 202, 313; 178/18.01, 18.03, 178/19.01, 18; 345/173, 179
See application file for complete search history.

(56) References Cited

U.S. PATENT DOCUMENTS

| | | | | | |
|---|---|---|---|---|---|
| 5,465,325 A | * | 11/1995 | Capps et al. | ................ | 345/441 |
| 5,467,407 A | * | 11/1995 | Guberman et al. | ......... | 382/186 |
| 5,500,937 A | * | 3/1996 | Thompson-Rohrlich | .... | 715/764 |
| 5,566,248 A | * | 10/1996 | Ulrich | ........................ | 382/187 |
| 5,596,350 A | * | 1/1997 | Capps et al. | ................ | 345/173 |
| 6,741,749 B1 | * | 5/2004 | Herbert, Jr. | ................ | 382/246 |

* cited by examiner

*Primary Examiner*—Daniel Miriam
(74) *Attorney, Agent, or Firm*—Law Offices of Albert S. Michalik, PLLC

(57) ABSTRACT

Described is electronic ink maintained as a software object, thereby associating ink functionality with electronic ink data. The ink may be separated into words or characters, with one object per word or character. By the associated functionality, applications that deal with embedded objects in general can automatically benefit from electronic ink, including having the object's functionality render the ink data as part the application's document. Further, because the ink data is maintained as an object, the data is automatically persisted in association with the document into which it is embedded. Ink-aware applications may call on methods of the electronic ink object to adjust formatting, search recognized ink along with text, and perform other functions. Via the electronic ink object, electronic ink substantially approaches much of the behavior normally available with text data, without requiring applications to interpret the ink data.

14 Claims, 9 Drawing Sheets

ELECTRONIC INK AS A SOFTWARE OBJECT

FIELD OF THE INVENTION

The present invention relates generally to computing devices, and more particularly to handwritten input used with computing devices.

BACKGROUND OF THE INVENTION

Contemporary computing devices allow users to enter handwritten words (e.g., in cursive handwriting and/or printed characters), characters and symbols (e.g., characters in Far East languages). The words, characters and symbols can be used as is, such as to function as readable notes and so forth, or can be converted to text for more conventional computer uses. To convert to text, for example, as a user writes strokes representing words or other symbols onto a touch-sensitive computer screen or the like, a handwriting recognizer (e.g., trained with millions of samples, employing a dictionary, context and/or other rules) is able to convert the handwriting data into dictionary words or symbols. In this manner, users are able to enter textual data without necessarily needing a keyboard.

Applications have been developed that know how to handle this handwritten input, including sending the user input to a recognizer at appropriate times. These applications provide the user with various features related to both the handwritten ink as written and the text as recognized. To this end, these applications maintain the handwritten data (electronic ink) in association with any recognized text in their own internal data structures.

While such an electronic ink application provides valuable features to users, many other things that most users intuitively associate with ordinary text or rich text are not provided. For example, if a document having the electronic ink input is saved as a file that is later reopened, only the recognized text may be available, i.e., the handwriting part of recognized data may not be kept. Another significant problem is that text is easily understood by other applications, while the handwriting data is not. Thus, even if the handwriting data is preserved with a document, the handwritten data can only be understood by the application into which it was entered. For example, when the user wants to send a document having electronic ink therein to another computer (e.g., as an e-mail attachment), the other computer may not have a copy of that application, and thus cannot interpret the other application's ink data.

Still other features associated with text, such as cut and paste operations, are easily performed with text data. The application that receives text (via the paste operation) can easily insert it into existing text in an appropriate manner. For example, the text is automatically aligned with any existing text on its line, it can be easily reformatted, searched, and so forth. This is not possible with handwritten input and contemporary application programs.

In general, electronic ink does not behave like text in a number of significant ways. Notwithstanding, it is becoming apparent that users want electronic ink to be more interchangeable and/or like text with respect to transferring it among computing devices and/or different programs, editing functions, and so on.

SUMMARY OF THE INVENTION

Briefly, the present invention provides electronic ink as a software object, such as a COM (Component Object Model) object, thereby associating functionality with ink data, by which the large base of applications that can generally deal with embedded objects can benefit from electronic ink. The object's functionality can handle operations such as rendering the ink data, sizing to match text, communicating with a recognizer to obtain recognition data, and provide other valuable ink-related features to an application that is not necessarily coded with any knowledge of electronic ink. Because the ink data is maintained as an object, the data is automatically persisted as part of any document into which the ink object is embedded. In general, via the electronic ink object, electronic ink substantially approaches many of the behaviors normally inherent in text data.

A suitable implementation of an electronic ink object format is provided, including the communication, rendering and sizing functionality that enables ink-unaware applications to benefit from electronic ink. Additional functionality also may be provided, in the form of callable methods, to enable applications coded with the knowledge of such electronic ink objects ("ink-aware" applications) to further provide electronic ink-related features. For example, once the ink has been sent to a recognizer, the electronic ink object maintains the recognition results, generally in the form of a list of ranked text word alternates, possibly including probability data. When an ink-aware application is performing a text search in a document, the application can call a method of an electronic ink object to access its maintained alternates, to determine whether the handwritten ink matches a text search term. In this manner, handwritten ink appears to be searched as if it was text in the document. Other methods enable an ink-aware application to format the ink, such as to change its color, bold it and/or italicize it, change its relative size or position, and perform other functions normally associated with text. The application need not duplicate this functionality or deal with how the ink data is arranged, but rather simply can call an appropriate method with any appropriate parameter values.

Other advantages will become apparent from the following detailed description when taken in conjunction with the drawings, in which:

DETAILED DESCRIPTION

Exemplary Operating Environment

Figure 1:
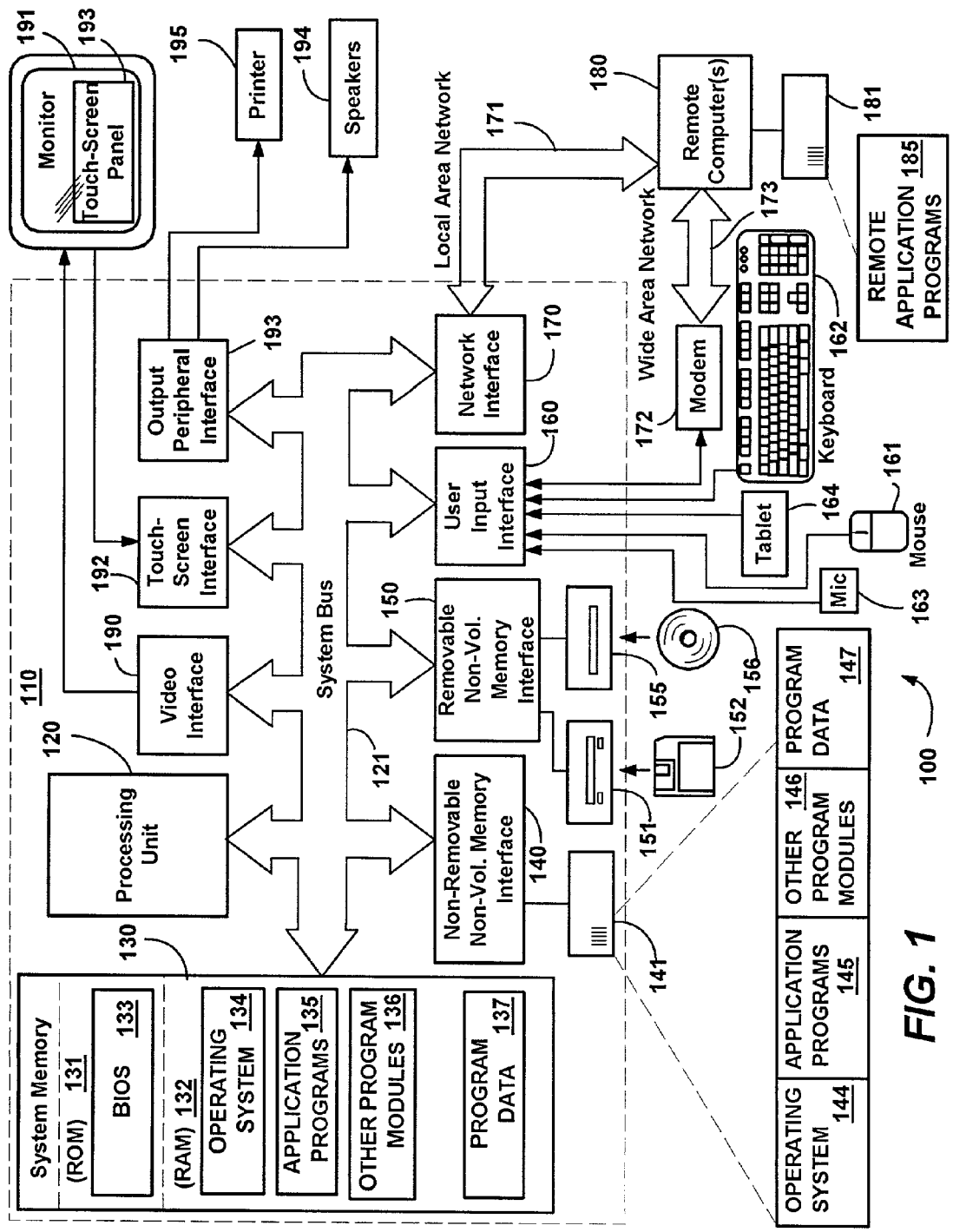
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Electronic Ink Objects

The present invention is primarily directed to electronic ink, which in general corresponds to a set of X, Y coordinates input by a user, and additional state information such as an "up" or "down" state. Notwithstanding, it will be appreciated that the present invention is applicable to virtually any type of user input that corresponds to words or symbols that can be mixed with and/or recognized as text, such as speech data. Thus, although for purposes of simplicity the present invention will be described with reference to handwriting input and display thereof, and especially examples of English cursive handwriting, the present invention should not be limited in any way to handwritten input and/or by the examples used herein.

As a further simplification, the user may be considered as entering ink input via a pen-tip (cursor) that writes on a tablet-like device, such as the touch-screen panel 193. Note that this may not be literally correct for all devices and/or in all instances. For example, some devices such as a mouse or a pen capture device do not have a real, physical tablet and/or pen-tip. For such devices, a virtual tablet may be assumed. In other instances, electronic ink may be generated by an application program or other software, in which event the tablet and pen-tip may both be considered to be virtual. Electronic ink is often more complex than simple X, Y coordinate data, and may have additional properties associated therewith. For example, tip pressure, angle data, writing speed, and so on may be maintained as part of the ink data.

In general, electronic ink may be maintained in any suitable form with any type of accompanying data. In accordance with one aspect of the present invention, electronic ink is maintained as an object, having both data and associated functionality, whereby object-compatible (e.g., capable of embedding COM objects) applications can interface with the objects to provide electronic ink features. This provides benefits to applications that are themselves not otherwise capable of working with electronic ink data, generally referred to herein as "ink-unaware" applications or the like. For example, a spreadsheet document that knows nothing of electronic ink can open a document with an electronic ink object embedded therein, and automatically obtain many of the benefits of electronic inking, as described below, including displaying the ink to a user. Because the electronic ink can be embedded as an object into documents and the like, the electronic ink object may be freely pasted into documents and transferred among various applications, with its full integrity maintained, regardless of the application's ink-related capabilities. Note that because the electronic ink is an embedded object, it is persisted to non-volatile storage (e.g., streamed to disk) without requiring the application to store the data. Moreover, the document with the embedded ink can be transferred to another computer, such as via an e-mail attachment.

Applications that are coded with an understanding of electronic ink objects ("ink-aware" applications) can further take advantage of many of the features and functions offered by the electronic ink object, without needing to duplicate the object's functionality. For example, such an application can invoke various methods that enable an ink-aware application to format the ink in ways that are very similar to text formatting, e.g., to change the ink's attributes such as its bold state, italicized state and/or color, and its relative size and position. Other methods enable an ink-aware application to perform other functions related to the electronic ink that are normally associated with text. For example, once the ink has been sent to a handwriting recognizer, the electronic ink object maintains the recognition results, generally in the form of a list of ranked text word alternates, and possibly including probability data. When an application is performing a text search, the application can call a method of an electronic ink object to access its maintained alternates to determine whether the handwritten ink matches a text search term. In this manner, handwritten ink appears to be searched as if it was text in the document.

Figure 2:
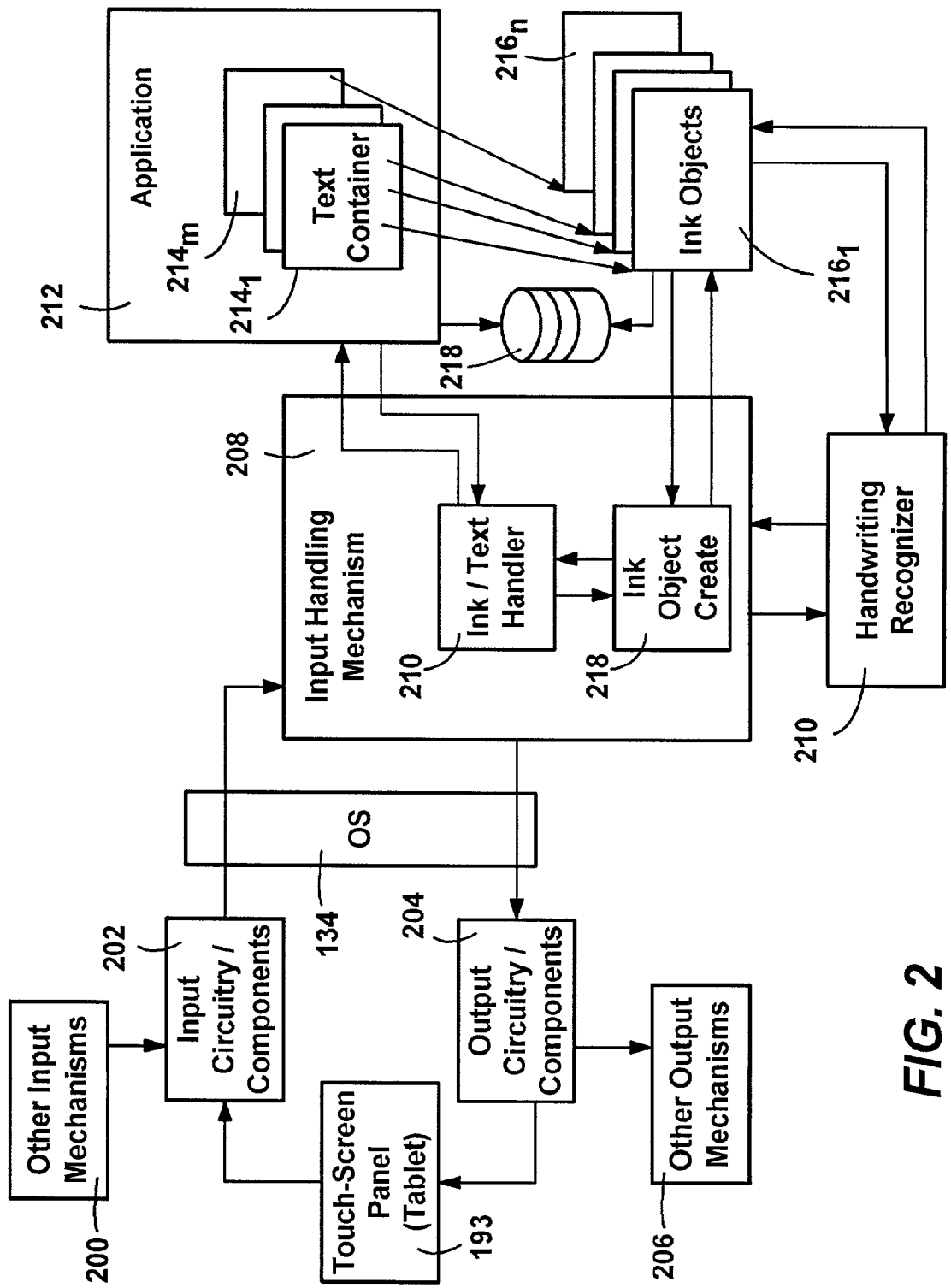
FIG. 2 is a block diagram generally representing components for handling electronic ink handwritten into a computer system and creating electronic ink objects therefrom in accordance with one aspect of the present invention.

Turning to FIG. 2 of the drawings, various components of the computing system 100 or the like are represented when the computing system 100 is configured for receiving handwritten input, in accordance with one aspect of the present invention. In FIG. 2, as a user enters data such as by handwriting data on the touch screen panel 193, (and/or by another input mechanism 200 such as the keyboard 162), input circuitry and/or other components 202 pass the information to the operating system 134. Depending on the state of the system and/or where the screen is contacted, the user input may be converted to text or treated as handwritten data. For example, when the screen displays a representation of a keyboard, and that keyboard is touched, the coordinates may be converted to an ASCII or Unicode character, or an editing command, and sent to an appropriate component (e.g., a word processor application having focus) to use. Alternatively, if the user is writing in a handwriting input area, the input may correspond to coordinate (stroke data). As is understood, the handwritten data may be in the form of coordinates, and may include other information, e.g., pressure data, timing data and so forth. The user input is typically reflected back to the user in some way, e.g., via display output circuitry/components 204 and/or via other output mechanisms 206 (e.g., as a spoken word).

To determine the meaning of the user input, the operating system may include or otherwise be associated with an input handling mechanism 208 that may includes an ink/text handler 210 to differentiate between text and handwriting data. In general, ASCII/UNICODE characters and editing commands are passed directly to the application 212 that currently has input focus, for maintaining within an appropriate text container $214_1$–$214_m$ or the like, while stroke data is first pre-processed, as described below. Note that if stroke data is received, the system may be arranged to pass stroke data directly to an application program if such an application is capable of handling it, however for purposes of the present example, the electronic ink will be pre-processed (e.g., by the input handling mechanism 208) prior to providing the electronic ink to an application.

More particularly, and in accordance with one aspect of the present invention, prior to providing electronic ink to the application, the handwritten input will be processed into electronic ink objects $216_1$–$216_n$. In one implementation, the ink objects comprise COM (Component Object Model) objects in the form of an "Embedded Content Object," as described in the reference entitled "*Inside OLE*, second edition," Kraig Brockschmidt (Microsoft Press), hereby incorporated by reference. Embedded Content Objects are simplified versions of ActiveX® objects, with some advantages, e.g., embedded Objects can be lazily loaded, and displayed using a cached visual representation. In general, COM is a standard for, among other things, brokering software objects within and between software applications, and COM objects are widely supported across many applications. COM objects are defined to have certain consistent behaviors, whereby applications that support COM objects in general will automatically support, at least to some minimal degree, the electronic ink object of the present invention when implemented as a COM object. CORBA (Common Object Request Broker Architecture) is another such standard infrastructure, and thus it can be readily appreciated that the electronic ink object of the present invention may be incorporated into COM or CORBA type object technology in general.

To create the electronic ink objects, the input handling mechanism 208 includes or is otherwise associated with the necessary ink object creation module 218 that creates an object instance for the raw data. In general, for purposes of convenience, each word that is written may correspond to one object (e.g., in English, French or German implementations), or each written symbol such as a character may correspond to one object (e.g., in Japanese, Chinese, Korean implementations), although other units (e.g., character pairs, parts of a character, sentences, lines and so forth) may alternatively be used, and even mixed (e.g., some objects represent sentences, others words, and still others characters) in a given implementation. To this end, the ink object creation module 218 may communicate with a handwriting recognizer (recognition engine) 220 to determine how the received ink should be separated, e.g., into words. Alternatively, not all computing devices that can input electronic ink have a handwriting recognizer, and thus the ink object creation module 218 may include its own logic and rules to determine how the ink should be separated into words. Such rules can be based on criteria such as the horizontal separation between strokes, the timing data between a pen-up and a pen down, and other known criteria. Alternatively, an application that is aware of electronic ink may be configured to control word breaks and the like as desired by the application/user thereof for viewing purposes and the like. In any event, one preferred implementation provides one object per word, since word processors and the like typically treat a word as an atomic unit when performing document formatting, word wrapping and so forth. Notwithstanding, although the description and examples herein generally refer to one object per word, it should be understood that an electronic ink object can be provided per character, symbol, phrase, clause, sentence, paragraph or any other grouping of words (such as a fixed number of words or characters, a written line and so forth), with appropriate data therein as desired for combining separate objects into one word and/or separating one object into multiple words.

Figure 3:
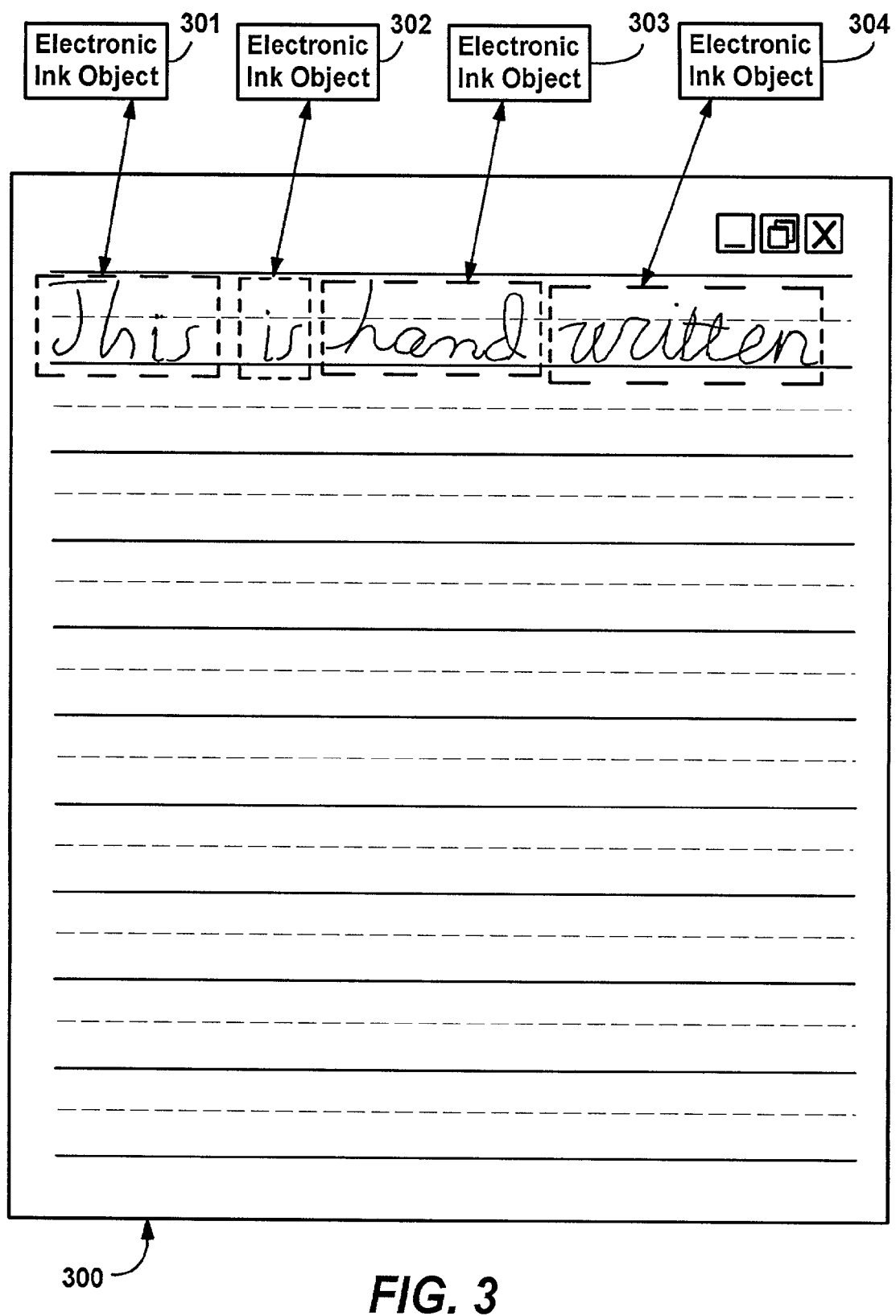
FIG. 3 is a representation of the contents of example handwritten input and how it may be separated into electronic ink objects in accordance with one aspect of the present invention.
Figure 6:
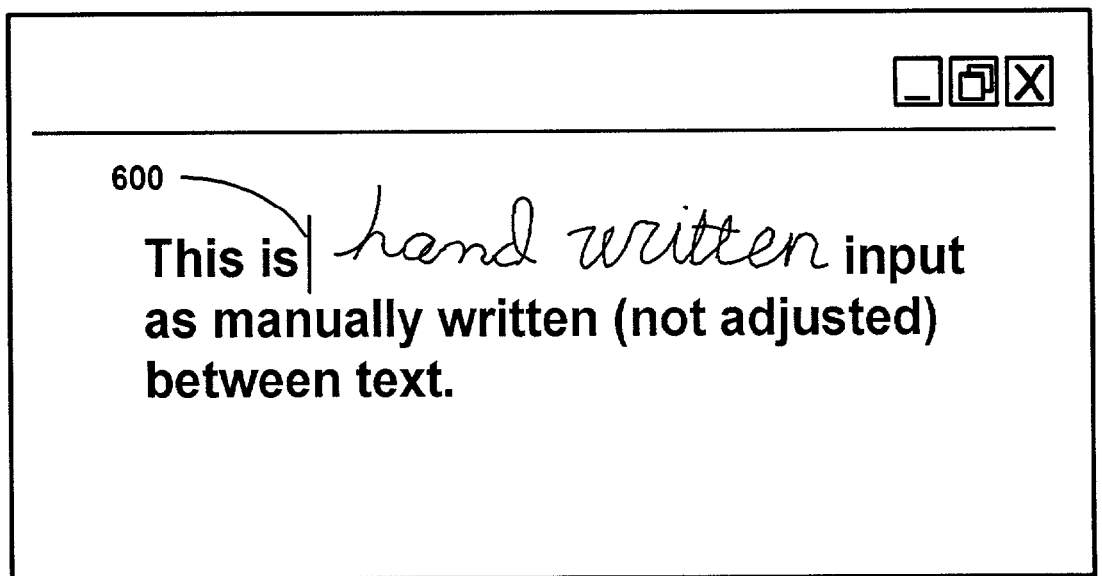
FIG. 6 is a representation of example handwritten input inserted into text.

By way of example, FIG. 3 shows electronic ink handwritten into a user interface (or program) 300 that is suitable for receiving electronic ink data. The handwritten input for the words "This is hand written" is separated into four objects 301–304, which may or may not have resulted from the ink having been passed to a recognizer. As represented in FIG. 3, each handwritten word having an associated object 301–304 is encompassed by a imaginary dashed box (not actually visible to the user). In general, a user presently has two choices for entering electronic ink handwriting data, the "lined" mode represented in FIG. 3, in which the user writes upon a guide with baseline, midline and ceiling line. Alternatively, the user can write anywhere on the screen, (except of course, to areas corresponding to commands such as one that would close the application), such as generally represented in FIG. 6. Note that other data capture modes are feasible, e.g., by providing a special window for handwriting input. Indeed, virtually any user interface mode is feasible, and the present invention is not limited to the example modes described herein.

In the lined mode example, the positions of the guide lines may be included in the ink data to help calculate the rendering size, and to assist with handwriting recognition. Guide line data is not available in full-screen mode, (one possible alternative user interface mode), but can be estimated by the object, as generally described below. Regardless of the data entering mode, data representing the position of the mouse or stylus (e.g., from the system message WM_MOUSEMOVE) are collected and sent to an electronic ink object. Note that the data can be sent to the object as a whole, or in multiple, smaller batches as the handwriting data is collected. Further, note that the ink data in maintained at a very high resolution, which preserves the original resolution of the input device. For example, touch-sensitive (input) screens typically have much higher resolution than the display device (output). When rendered on the screen, the original data points are scaled into screen coordinates. The original high resolution data is retained, even when the electronic ink object is passed through devices that do not have the ink object functionality (e.g., in a library of functions, described below), or passed through applications which do not natively understand electronic ink objects.

Returning to FIG. 2, the ink object creation module 218 (which may be considered part of the object's functionality or separate therefrom) also may process the ink data in other ways, e.g., by multiplying by X and Y factors to normalize the ink to a standard size, increasing or decreasing the number of coordinates to match a system limitation (e.g., a 16-bit coordinate system), compressing the ink data, smoothing the ink data in some way (although smoothing may instead be done when rendering an image of the ink), and so forth. For example, one of the output data formats (discussed below) may comprise the Windows® Metafile format, which is limited to 16-bit coordinate values, whereby entered handwriting data may be checked and scaled if necessary to keep all coordinate data values within the range of a 16-bit signed integer (less than 32,767).

In the current implementation, the input handling mechanism 208 also calls the handwriting recognizer 220, if available, and receives a list of the ten top alternates (candidates) which it provides to the electronic ink object (e.g., $216_1$) to store for later reference and use, e.g., for rendering as text, searching, and so on. Note that the electronic ink object $216_1$ may also call the handwriting recognizer 220 directly, including after creation and when embedded in a document. Further, note that the present invention is not dependent on handwriting recognizers generally or on any particular handwriting recognizer. As such recognition generally will not be described herein, however one suitable recognizer is able to return a list of alternates when provided with ink data, along with other information, including baseline information, as described below. Handwriting recognizers are generally described in U.S. Pat. Nos. 5,313,527 and 5,467,407.

Note that because handwriting recognition may be performed at a later time, or performed again (e.g., with a different recognizer), the objects may contain information that allow the originally entered ink data to be reconstructed from the ink data maintained in the objects. For example, as described below with particular reference to FIGS. 8 and 9, any X and Y factors used in normalization are maintained with the object, and also an object may contain identifiers or pointers to its previous and next objects, if any, so that the ink data may be provided to the recognizer as it was originally entered by the user, and not as initially processed by the ink object creation module 218, object functionality and/or handwriting recognizer 220.

In keeping with the present invention, each electronic ink object (e.g., $216_1$) is arranged to persist its ink data to non-volatile storage 218 in association with the document or the like into which is embedded, so that the object data will automatically be part of with its containing document. To this end, the electronic ink objects may be serialized (stored on disk) via a standard set of functions designed to work in any application that supports COM objects. Note that the format of the ink is controllable, and can be compressed, or uncompressed. By adhering to this standard, the electronic ink object can be serialized as part of the native data format of many applications. Such functionality works automatically, with no modifications to existing applications required. Because the document contains the electronic ink object, the electronic ink object essentially moves with the document. Thus, for example, if the document is e-mailed to another computer, the electronic ink object is transferred with the document. Note that if the ink data has been sent to a recognizer 220, recognition information including at least one text alternate may be part of the data persisted with the object, along with other data such as baseline data returned by the recognizer that helps in aligning the object with text, as described below.

Figure 4:
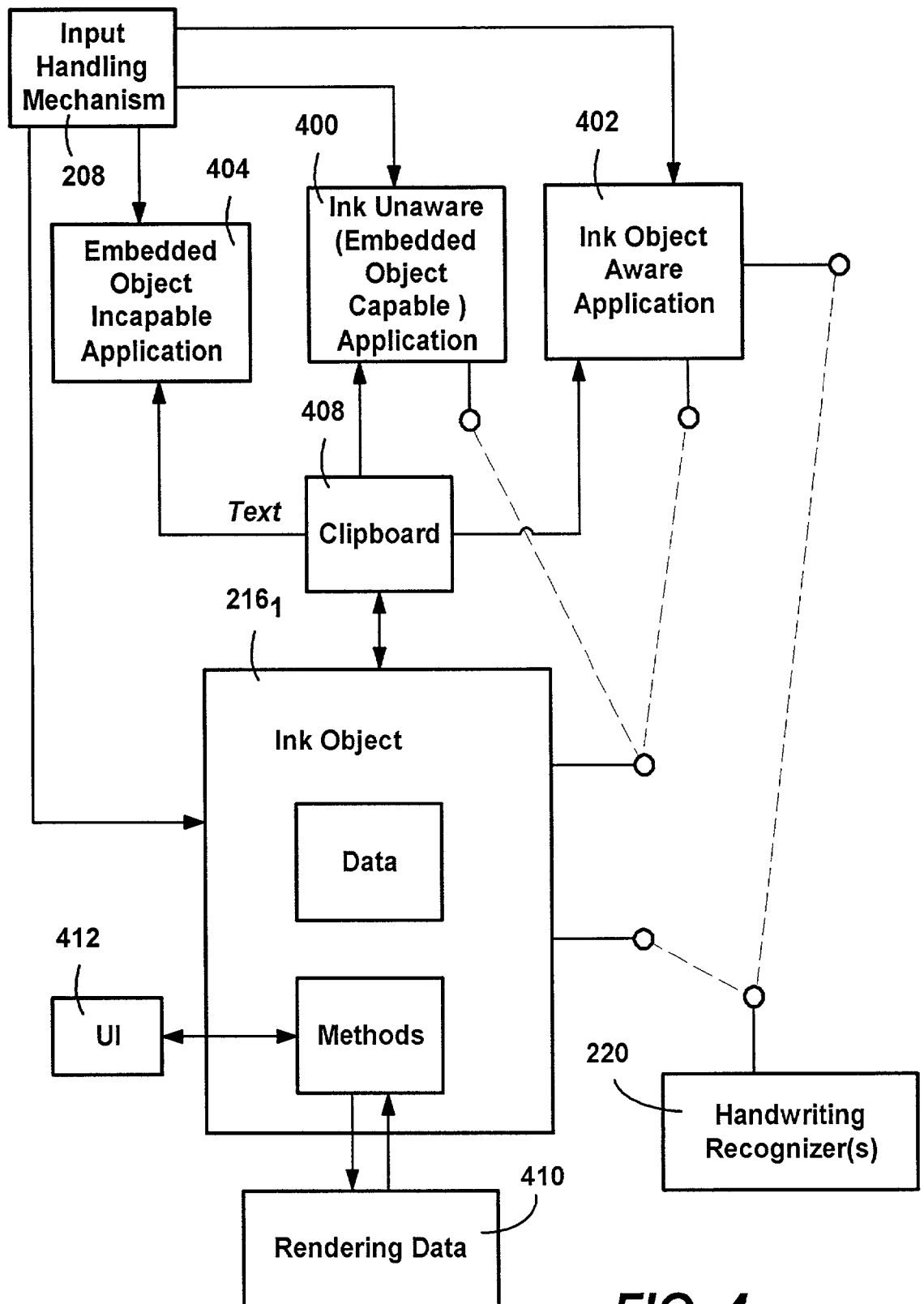
FIG. 4 is a block diagram generally representing an electronic ink object useable by applications in accordance with one aspect of the present invention.

FIG. 4 represents an ink object, such as the ink object $216_1$ of FIG. 2, used by various types of application programs 400, 402 and 404. In general, various types of applications may be in use, including an application type 400 that is not ink-aware, but is capable of embedding objects. Such applications 400 are able to open a document with objects embedded therein, or later have objects embedded into an already open document by pasting them via a clipboard 408, and call the object to render an image of the ink. Note that while the present invention provides substantial benefits with text-oriented applications such as word processing and spreadsheet programs, the present invention also allows drawing programs or the like to embed the ink objects, whereby the drawings programs can at least have the handwritten data displayed as part of its drawing.

If a document includes an electronic ink object (or objects), and the functionality associated with an electronic ink object is available to the system on which the application 400 is running, (e.g., as a dynamic link library or DLL and/or in the operating system), the application 400 can obtain many benefits of electronic ink objects. Note that if the DLL or the like is not available, the application will display the object as a bitmap or other image, whereby the handwriting data may appear as it was last rendered. For example, the icon displayed by the application to represent the presence of that object may be a bitmap of the handwritten data as last rendered. Note that with the electronic ink object as an embedded object, even if the DLL or the like that provides the functionality for that object is not present on a particular machine, the integrity of the ink object data is preserved when transferred to and from that machine. This is also true when the document embedding the object is opened with applications that are not ink aware, i.e., the object's integrity is preserved. Thus, the object data is fully available for later use when the functionality is present on a machine, or when an ink aware application later accesses it, regardless of where it has been.

Figure 5:
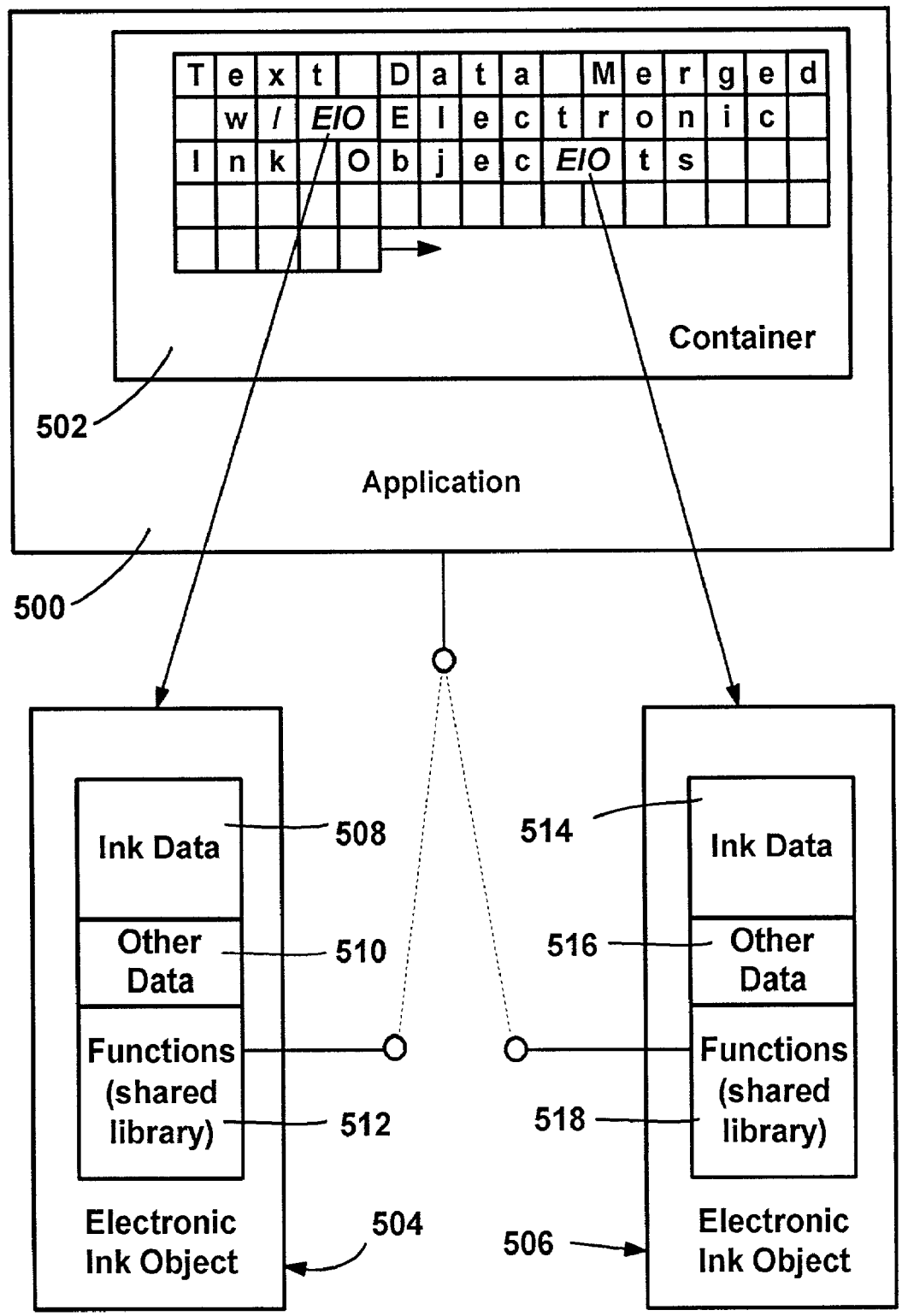
FIG. 5 is a representation of an application accessing the data and functionality of electronic ink objects via interfaces in accordance with one aspect of the present invention.

In a typical situation, the electronic ink object functionality will be available to the object, whereby among other functions, the object will render itself. In one implementation, the object will render itself in a manner that aligns and sizes to the surrounding text. By way of example of how a text-based application might embed an electronic ink object, FIG. 5 shows an application 500 that maintains a text container 502 with pointers or the like that link electronic ink objects 504, 506 to the text. Note that the text container 500 may comprise a container object or other similar data structure. In any event, the text container 500 or similar data structure maintains the objects' relative positions within the text data. As the text container is filled in and edited, the application displays the text, and when it reaches an electronic ink object, calls a method on the electronic ink object to render itself, which may include sizing itself to the surrounding text, as described below. The application then causes the remaining text to be appropriately displayed relative to the object. For example, with electronic ink, the application may output the next set of text characters to the location that follows a rectangular area specified by the object. In this manner, even if an application is ink-unaware, the handwritten words essentially appear to the user right along with the text, with each text and ink word correctly positioned in the document.

Figure 7:
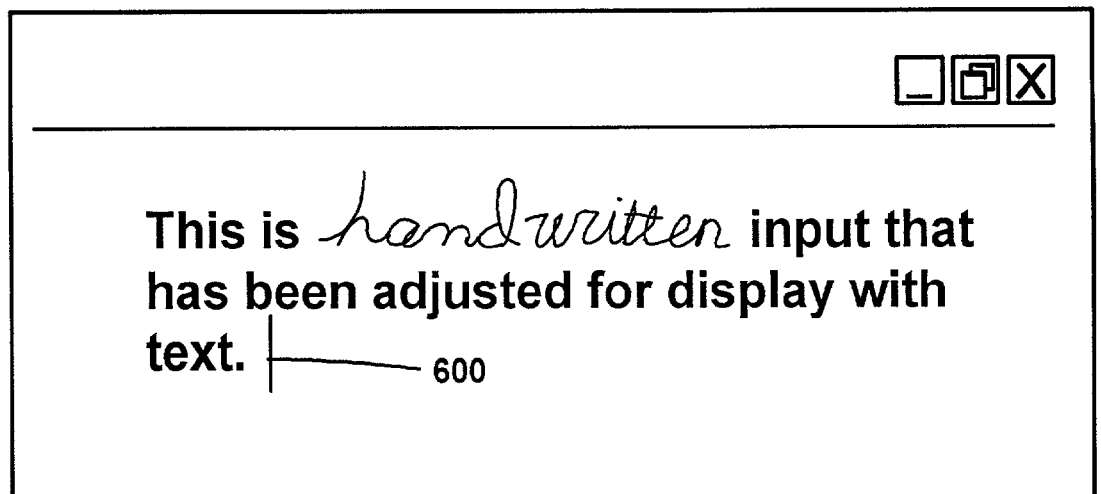
FIG. 7 is a representation of the example handwritten input of FIG. 6 resized by functionality of the electronic ink objects for matching the electronic ink data when rendered to the text's size in accordance with one aspect of the present invention.
Figure 8:
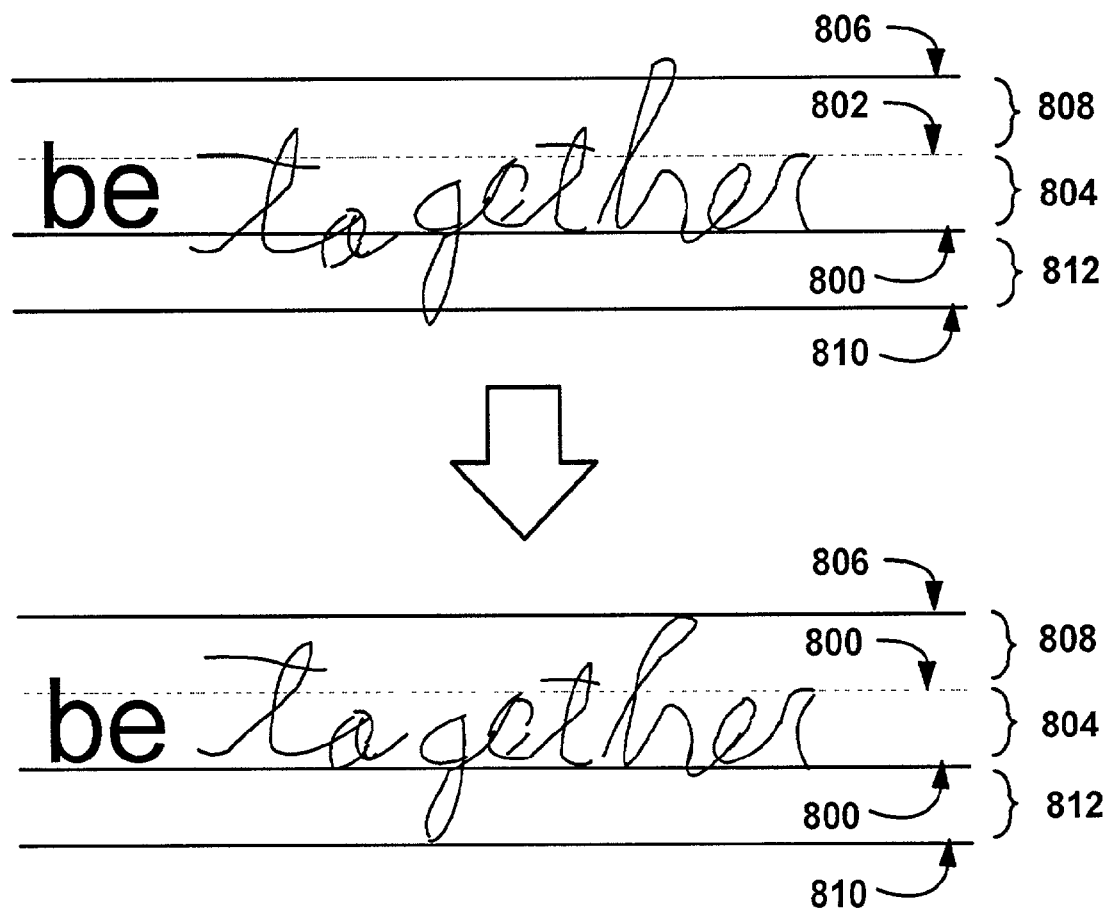
FIG. 8 is a representation of example handwritten input being adjusted by functionality of electronic ink objects to enhance their displayed appearance, in accordance with one aspect of the present invention.

FIGS. 6, 7 and 8 provide an example of the object's resizing functionality in more detail. Note that in FIG. 6, a user has written (e.g., directly onto the application window at a blinking cursor 600 or the like) words that are noticeably larger than their surrounding text. Upon subsequent rendering, e.g., after the text is edited or the user has stopped writing for a sufficient time, the displayed representation of the electronic ink is resized to better match the surrounding text, as generally represented in FIG. 7. Note that as shown in FIG. 4, the object allocates or includes some memory 410 for working with the rendering data, that is, the ink as stored in the object is not changed, but instead the object constructs and manages data points corresponding to the image to display.

To resize the ink, as generally shown in FIG. 8 (using different words for illustration), the ink is considered relative to a baseline 800 and a midline (dashed line) 802. Significantly, for alignment, the baseline of the displayed ink should match the baseline of any surrounding text. Note that the baseline is not the bottom of the characters, but rather corresponds to the bottom of characters that do not have descenders, e.g., the baseline of the word "together" corresponds the bottom of the "to" and "ether" letters and not to the bottom of the "g" letter. The recognizer 220 may determine baselines, and if so, this information is maintained with the object's data. For electronic ink data that has not been recognized, the ink object contains logic that determines a baseline reasonably well, e.g., by looking for reasonably consistent y-minima over the x-coordinate length of a word, with compensation for any detected writing angle. Other logic can factor in the overall size of a word, and even consider the baselines of other recently written or surrounding objects.

In addition to aligning the baseline of the handwritten image or images to that of the text, the size of the displayed ink can be increased or decreased relative to the surround text. To this end, the ink coordinates can be multiplied by a factor as needed to match the baseline-to-midline region 804 to that of the text's baseline to midline region. Note that the midline is the top of characters without ascenders, e.g., the midline of the word "be" corresponds to the top of the "e" letter and not the top of the "b" character, since the "b" character has an ascender. Again, the functionality in the object can contain the necessary logic to reasonably determine a midline (such as via consistent y-maxima over the x-coordinates) if not provided by a recognizer.

Further, and as generally represented in FIG. 8, if the handwritten word has overlarge ascenders or descenders, then the outlying data points associated with those artifacts is scaled (e.g., in a nonlinear manner) to shrink them while reasonably retaining the shape of the ink. This is done so that the displayed ink will not overwrite text on lines above and below it. Thus, any ink extending above a ceiling line (top limit) 806 is scaled to fit into an ascender region 808, while any ink extending below a floor line (lower limit) 810 may be similarly scaled to fit into a descender region 812. To this end, any suitable function such as linear multiplication function on a sliding scale (e.g., that adjusts coordinates further from the baseline more and coordinates closer to the baseline less) may be employed to fit the ink into the appropriate region. Note that this scaling essentially handles extreme ascenders and/or descenders without resizing the entire word based on such extremes, whereby the baseline-to-midline region of the word reasonably matches the text's baseline-to-midline region, which generally looks better.

Lastly, it should be noted that other data manipulation functions may be employed that are generally directed to improving the appearance of the rendered image. For example, a smoothing function may be employed prior to display. In one implementation, the data points are sent to a Bezier curve generation algorithm, and the resulting Bezier data points are passed to the Microsoft® Windows® GDI method PolyBezier for final rendering. Such Bezier curves are a common mathematical construct used for drawing smooth curves, and may be used as a rendering mechanism with electronic ink objects to improve the appearance of digitized handwriting, which tends to be somewhat jagged due to the coarseness of the data capture hardware and unsteadiness of the user's hand. Drawing may also employ the anti-aliasing APIs available in GDI+.

Returning to FIG. 4, another application type 404 may be one that is incapable of embedding objects. Such applications 404 may be able to have text pasted into them, however, and thus one way in which the ink object $216_1$ may be used by such a limited application, is to put corresponding text (if previously recognized) onto the clipboard 408 (or the like) that is used for cutting and pasting operations. Note that such clipboards normally maintain a variety of formats, and for example, as one of its supported formats, text, the clipboard 408 may be arranged to receive the best (most-probable) text word alternate when copying the ink object. If so, when pasting to the text-only application 404, the application 404 receives that alternate as text. Note, however, that such an application does not have the object embedded therein, whereby if a document of that application is opened by another application, only the text is present.

A third type of application is one that is specifically aware of electronic ink objects, and can utilize their associated functionality. Such applications can call an object's various exposed methods for specific purposes, such as to format the ink (e.g., to bold it, italicize it, change its color), resize the displayed image, and so forth. To this end, the user may select objects (and possibly surrounding text) by a click-and-drag operation. Then, for example, if the user chooses to italicize the ink, then the ink aware application calls a formatting method of the object, whereby the object skews its data points in the rendering data 410 (FIG. 4) to the right to provide the italicized look. A general listing exemplifying various methods available to applications, along with a brief description thereof, is provided as Appendix A.

Note that in addition to text and Windows® metafile formats, other common data formats may be supported for use across many applications, e.g., via the clipboard 408. The Electronic Ink object can render itself in several of these formats, as requested by the rendering application via standard interfaces. Such supported formats in one current implementation are Enhanced Metafile, Windows® Metafile, Windows clipboard format, Windows bitmap, and plain text. Thus, the same electronic ink object may render itself differently, depending on the display capabilities of the application.

Searching is a fundamental element of text processing, and electronic ink objects that have been recognized support searching operations. To this end, the electronic ink object maintains a list of top alternate words returned by the handwriting recognition engine 220, and provides access to the alternate words via an interface. This allows ink-aware applications (that know to call the electronic ink object interfaces) to implement string searching across electronic ink objects. Note that an application is not limited to exact text searching with the top alternates or alternates, but instead, because the application has access to each of the alternates, and not just the top one, virtually any matching scheme desired by an application with respect to the alternates may be employed. For example, one scheme may look for a percentage of matching characters, with a user-determined threshold percentage. Other variations include giving different weight to certain characters, and/or factoring in the relative number of syllables (returned by some recognizers and thus maintainable with the object) and/or the relative lengths of the words. The probabilities of alternates may be used as a factor in the determination, and other factors and possible tests may be used by a given application.

In addition to the maintained ink data, data is maintained that allows the object to recreate the handwritten input as originally entered. By way of example FIG. 8 shows one such situation wherein further ink processing including recognition may be desirable. In FIG. 8, the handwritten input may be considered as one word—together—, two words,—to gather—, or three words—to get her—. Thus, if a user selects this handwritten data and later requests recognition thereof, such as for the first time or by a different recognizer, the object data cannot simply be sent to the recognizer without risking errors caused by an earlier word-break estimation.

To recreate the handwritten input, the object maintains, for each object, the normalization data needed to undo any normalization used for that object. Further, the object keeps identifying information about previous and next objects, if any, so that the "un-normalized" ink can be recombined with its surrounding ink. For example, if in FIG. 8 three objects were used to represent "to," "get" and "her" words, a single set of ink will be sent to the recognizer.

Figure 9:
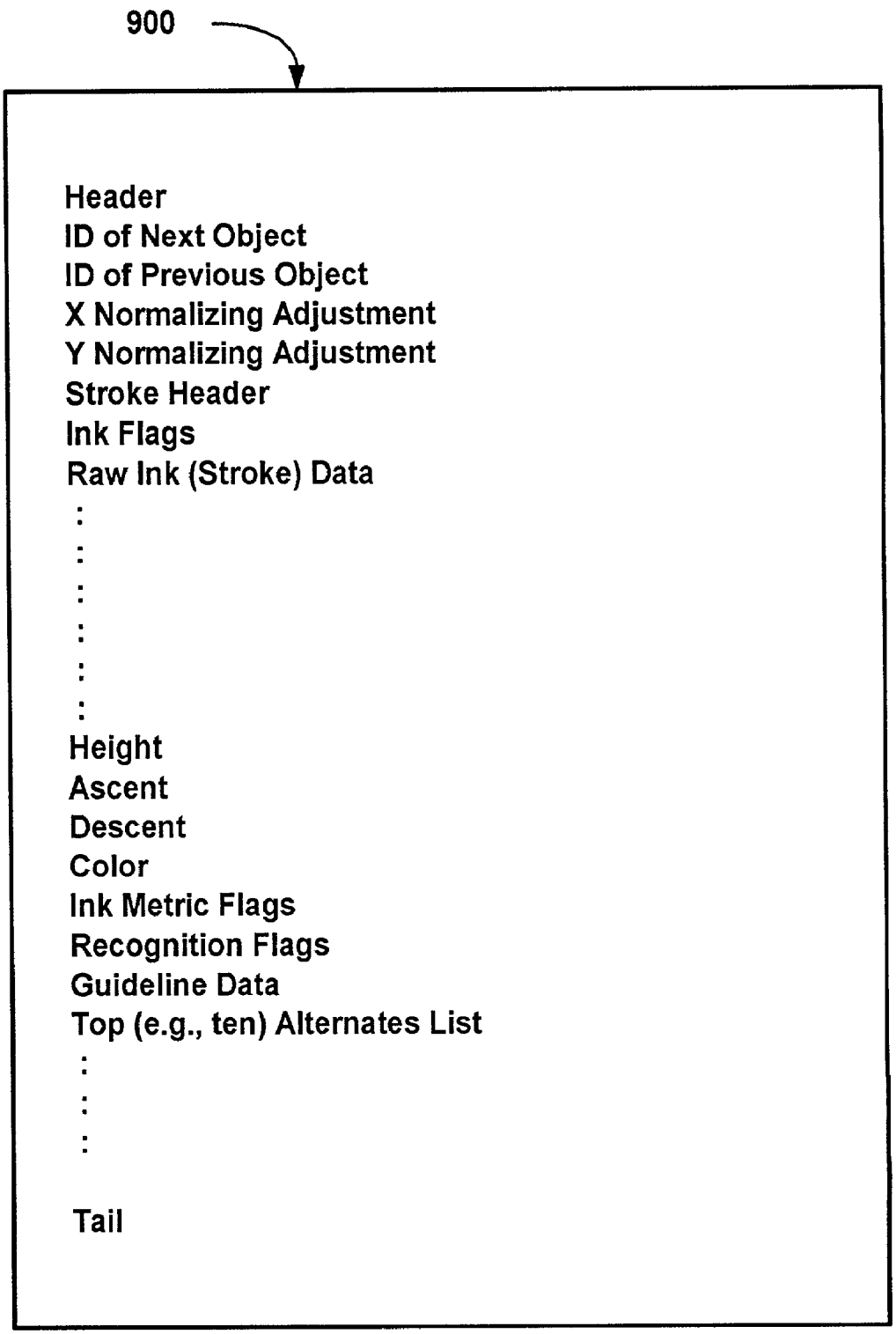
FIG. 9 is a representation of various data fields maintained in an example electronic ink object in accordance with one aspect of the present invention.

FIG. 9 shows some of the data fields that may be maintained in an electronic ink object's data 900, including some header information that, for example, contains the offsets of the various fields, the identifiers of any previous and next objects, if any, and the normalization factors. Note that FIG. 9 is illustrative only, and the data fields may be in any suitable order, additional fields may be present, and other fields may be removed. The following tables sets forth some information that may be maintained as part of an ink object's data:

```
typedef enum enumINKMETRIC_FLAGS
{
    IMF_FONT_SELECTED_IN_HDC = 0x00000001,
    IMF_ITALIC = 0x00000002,
    IMF_BOLD = 0x00000004
} INK_METRIC_FLAGS;
```
IMF_FONT_SELECTED_IN_HDC
tells the ink object whether it should use its own internal INKMETRIC font parameters, or query the hardware device context (hdc, supplied in the drawing call) for font data
IMF_ITALIC
Tells whether or not the ink should be rendered in italics mode
IMF_BOLD
Tells whether or not the ink should be rendered in bold mode.

-continued

```
typedef enum enumGetCandidateFlags
{
    TCF_ALLOW_RECOGNITION = 0x00000001,
    TCF_FORCE_RECOGNITION = 0x00000002
} GET_DANDIDATE_FLAGS;
```
TCF_ALLOW_RECOGNITION
This flag specifies that if a top candidate from the recognized alternates list is requested, but no alternatives are present in the object's alternate list, then the object should invoke the recognition engine to generate an alternate list
TCF_FORCE_RECOGNITION
This flag specifies that the object should invoke the recognition engine to generate an alternate list even if there is already an alternate list currently available.

```
typedef struct tagINKMETRIC {
    INT iHeight;         // Ink height
    INT iFontAscent;     // Assent height
    INT iFontDescent;    // Descent height
    DWORD dwFlags;       // ink metric flags defined above
    COLORREF color;      // Color
} INKMETRIC, *PINKMETRIC;
```
iHeight
Specifies the overall height of the font
iFontAscent
Specifies the distance from the font baseline to the font "ceiling"
iFontDescent
Specifies the distance from the font baseline to the font "floor"
(iFontAscent + iFontDescent = iHeight)
dwFlags
Contains the values from INK_METRIC_FLAGS, defined above
color
Defines the RGB color value in which this ink object is to be rendered.

Other internal data structures may include:

```
// StrokeHeader
typedef struct tagSTROKEHEADER
{
    UINT cHeaderSize;      // Number of bytes in header
    UINT cStreamSize;      // Number of bytes in stream
    UINT cAlternatesOffset;
    UNIT cGuideOffset;
    UINT cStrokeOffset;    // Starting position of stroke
                           // data
    UINT nID;
    UINT nPrevID;
    UINT nNextID;
    DWORD dwFlags;         // Content flags
    RECT rectBounds;       // Size of ink in TIP (device
                           // independent) coordinates
} STROKEHEADER;
```
This set of data is written into the serialization stream for use as an index when reading the stream.

```
// Stroke
typedef struct tagSTROKE
{
    UINT cPoints;       // Number of data points
    BOOL fUpStroke;     // 0 = normal; 1 = upstroke
    POINT *pPoints;     // Point array
    UINT *pPressure;    // Pressure array
    UINT *pTime;        // Time array
    UINT *pAngle;       // Angle array
} STROKE;
```
This data structure contains the data points associated with one stroke.

-continued

```
// StrokeList
typedef struct tagSTROKELIST
{
    UINT cStrokes;          // Number of strokes
    STROKE *pStrokes;       // Stroke array
} STROKELIST;
Contains the stroke data structures associated with this
object
```

```
// Ink Flags
enum
{
    LOSSY =     0x00000001,  // Stream is compressed: lossy
    LOSSLESS =  0x00000002,  // Stream is compressed:
lossless
    XYPOINTS =  0x00000004,  // Data set contains XY points
    PRESSURE =  0x00000008,  // Data set contains pressure
    TIME =      0x00000010,  // Data set contains time
    DS_ANGLE =  0x00000020   // Data set contains angle -
                             // ANGLE is used by richink
};
Defines flags for data compression and stroke contents.
```

```
// Guide data type 0
typedef struct tagINKGUIDE_0
{
    LONG nMidline;
    LONG nBaseline;
} INKGUIDE_0;
Defines the position of the midline and baseline
relative to the ink strokes.
```

Figure 10:
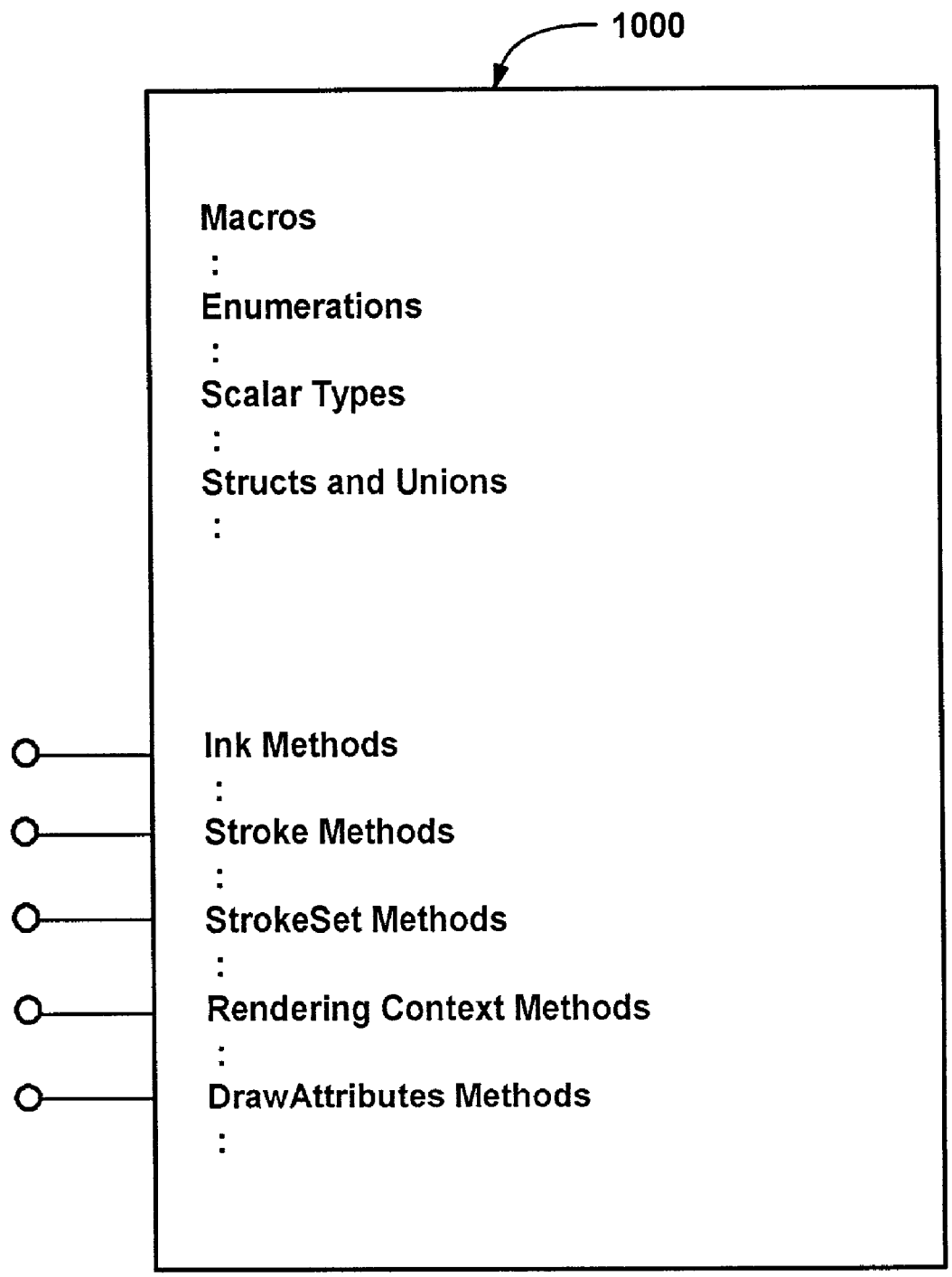
FIG. 10 is a representation of various interfaces provided in an example electronic ink object for invoking the methods thereof in accordance with one aspect of the present invention.

FIG. 10 shows some of the interfaces to the methods of an electronic ink object 1000 as described herein and set forth in Appendix A. Note that the functionality of these methods is not physically contained in the object (such as generally represented in FIGS. 4 and 5), but rather is in a shared library of functions such as a DLL, as is known with objects in general.

In addition to these listed methods and data, additional functions and/or data may be provided to enhance the object's usability and provide additional features with respect thereto. For example, a user may right-click on a rendered object and, via user interface functionality of the object, receive a user interface 412 (FIG. 4) with a number of selectable choices. Note that the user interface functionality may be associated with the object, whereby a user can directly invoke certain functions even when working in an ink unaware application. One such choice may be to toggle the object between its handwritten appearance and its recognized text, possibly allowing for selection of an alternate from the list maintained therewith. The text may be displayed (e.g., slightly) differently in the application to indicate to the user that it not simply ordinary text, but is backed by an object.

Another function that may be provided allows users to merge multiple objects into one object and/or separate one object into multiple objects. Such functions enable the strokes in an ink object or between ink objects to be added to, modified, deleted, merged, copied, extracted, transformed, cropped and split. For example, as shown above with respect to FIG. 8, a user may want the three words "to get her" to be a single object "together" for editing purposes and the like. A merge function may be manually initiated by the user or may be automatically performed, such as if the user selects "together" as an alternate. To this end, the ink data from the "get" and "her" objects may be copied into the "to" object, after re-computing for any normalization and the like, the alternates rearranged, the "next" object data copied from the last ("her") object, and so forth, followed by the "get" and "her" objects being deactivated or discarded.

Similarly, a user can separate one object into another, so that, for example, a user is not required to have two words such as "to" and "gather" word wrap as a unit, be searched incorrectly, and otherwise act as a unit, simply because an initial estimate determined that only one word was entered. Again, such a separation function may be automatically invoked in response to a user selecting a two-word alternate. Further, a user may wish to edit the ink, such as to format one part of a word and not another, whereby separation into multiple objects would enable such a feature. To this end, a new object is created from the other, with appropriate linking identifiers modified in each, ink data of the other removed from each, and so forth.

Still another function that may be provided involves alternate recognizers. For example, if the word was recognized with one (e.g., U.S. English) recognizer, but the current user wants to use a different (e.g., British) recognizer, the user can invoke one by an appropriate user interface, (e.g., provided via a right click). The object can then call the recognizer.

Other features may be provided by the application to enable multiple objects to be treated as a whole. For example, a user may select and highlight an entire paragraph, with three different objects therein. If the user chooses to format the entire paragraph, the application can separately call the appropriate method or methods of each object for this purpose.

In addition, other functions may be globally performed across multiple objects without the application separately calling each object. One way in which this may be accomplished is to have the objects arranged to call other objects that are grouped therewith for global functions. Another way in which this may be accomplished is to have an entity such as a container object maintain a global list of object identifiers (a list of IUnknown PTRS), whereby for global functions, the container object may be called which in turn calls each of the object listed therein.

Moreover, because in the present invention ink is arranged as an object, preferably a COM object, the ink may be transmitted live over a network, such as by using distributed object technology or the like. Remote collaboration using an electronic ink object is possible, e.g., a user can electronically handwrite notes onto another user's document, and vice versa. Two computing devices may be linked in some way, and use the ink object live, e.g., a user may write on a pocket-sized personal computer and have the resultant electronic ink object transferred over a wireless link to a desktop computer.

As can be seen from the foregoing detailed description, there is provided an electronic ink object, that may be embedded into a document, and preserved with the resolution and accuracy of the ink maintained, even if the ink is scaled or transformed for display purposes. An application that supports embedded objects can have the ink object render itself, and thus need not directly draw a representation of the ink or otherwise deal with ink data. Ink-aware applications can further call the ink object's functionality to operate on the ink, such as for formatting or searching purposes, again without directly dealing with the ink data. The electronic ink object provides functionality that enables electronic ink to approach the many features associated with text, and further is arranged to integrate with text data in a manner that is visually appealing and intuitive to users that are familiar with text data operations.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

APPENDIX A

Ink Object

The following interface may be used to return basic information about the ink object. It may also return information that is shared among strokes and points for this ink object. For example, if the points in this ink object are "cursor down" points, this will be reported through this interface. If the points are recorded using the same tablet, and that tablet supports pressure, then it possible to find out that pressure is supported for all points.

This interface supports the following features:

Methods in Vtable Order

| | Description |
|---|---|
| IUnknown Methods | |
| QueryInterface | Returns pointers to supported interfaces. |
| AddRef | Increments reference count. |
| Release | Decrements reference count. |
| Methods | |
| GetAttribute | This function gets ink object attributes to a provided buffer location. |
| GetBoundingBox | This function returns the bounding rectangle of the ink in the ink space coordinates. The rectangle coordinates are in same units as the ink coordinates. The bounding box will take into account the pen width of the strokes in the ink object as well as other drawing attributes that apply for each stroke. For example, if a given stroke is drawn as a Bezier fitted curve with variable pressure, the method will correctly take into account all of these facts when computing the bounding box. |
| GetPropertyList | This function returns to a provided buffer location the array of GUIDs of the properties that are global for this Ink Object. |
| GetPropertyData | This function is used by an application to query the ink object for the value associated with global ink property specified by GUID. If GUID passed in is not one of the global ink properties in the ink object the function fails. |
| SetPropertyData | This function is used by the application to create or change global ink property specified by GUID. Calling SetPropertyData for a GUID not in the Ink Object results in the property being created. If the property already exists then the value is overwritten. Predefined GUIDs values have an explicit type. |
| DeletePropertyData | This function deletes the ink property data of the property identified by GUID from the ink object. |
| GetDrawingAttributes | Returns a set of drawing attributes associated with a cid for this ink object. Calling IInkObject::GetDrawingAttributes before calling IInkObject::SetDrawingAttributes will return the default set of drawing attributes. The drawing attributes associated with a given stroke can be obtained by calling IInkStroke::GetDrawingAttributes. |

-continued

| | Description |
|---|---|
| SetDrawingAttributes | This function sets the drawing attributes for all the future strokes that will be drawn with this cursor id. If the ink is being generated by the application and is not coming from a TC then set CID of zero. If no drawing attributes are explicitly set for a cursor then the default drawing attributes are assumed. Calling IInkObject::SetDrawingAttributes does not increase the reference count on the Drawing attributes object since the attribute values are copied and saved in the Ink Object. Calling IInkObject::SetDrawingAttributes for the second time with different attributes but the same cursor id will only cause subsequent strokes to be drawn with the new attributes but does not affect strokes already drawn. The drawing attributes can later be changed by calling IInkStroke::ModifyDrawingAttributes or IInkObject::ModifyDrawingAttributes. |
| IInkObject::ModifyDrawingAttributes | This function modifies the drawing attributes of the already existing strokes, regardless of the cursor id that was originally used to record the strokes. Calling SetDrawingAttributes does not increase the reference count on the Drawing attributes object since the attribute values are copied and saved in the Ink Object. Calling IInkObject::ModifyDrawingAttributes only affects the strokes specified by a stroke set and has no effect on the strokes that will be written in the future. The drawing attributes that will be drawn in the future will use the set of drawing attributes specified by IInkObject::SetDrawingAttributes. |
| GetInkSpaceRectangle | This function returns an Ink Space Rectangle for the current ink object. |
| SetInkSpaceRectangle | This function sets the Ink Space Rectangle for the current ink object. |
| GetStrokeCount | Returns a count of the strokes in the Ink Object. |
| GetStroke | Returns a stroke in the Ink Object. |
| MergeStrokes | Merges a contiguous range of strokes into a single stroke. |
| DeleteStrokes | Deletes Strokes from a specified starting point. |
| CreateStrokeSet | Creates empty stroke set |
| DeleteStrokeSet | Deletes a stroke set |
| ExtractStrokeSet | This function creates a new ink object from a subset of strokes in the original ink object. Subset of strokes is specified as either strokes not contained in an identified stroke set or those contained in this stroke set, depending on a flag. The strokes in the original ink object are optionally deleted, depending on whether a flag is set. |
| Clone | Creates a new ink object, in memory, that is an exact clone of the original. The reference count of the new ink object is set to one upon successful return from this function. |
| Extract | Delimits ink to be "cut" (as in cut and paste operation) or extracted out of an existing ink object. |
| Trim | This function moves the bounding box of the ink to the origin and resets the Ink Space Rectangle of the ink object to be equal to its bounding box that is now aligned with the origin. |
| IInkObject::Clip | This function clips the whole ink object to a specified rectangle. |
| MergeSimple | Merges (or "pastes") the Source Ink Object into the current Ink Object at the target point. The strokes of the Source Ink Object are sequentially appended after the strokes of the existing ink object and the coordinates are modified so that the ink is merged starting at the specified point. |

-continued

| | Description |
|---|---|
| Merge | Merges (or "pastes") the Source Ink Object into the current Ink Object and scales it into the specified rectangle. The strokes of the Source Ink Object are sequentially appended after the strokes of the existing ink object and the coordinates are modified so that the ink is merged and scaled inside the rectangle. |
| HitTest | Use this function to find out which strokes, if any, when drawn taking into account the full set of drawing attributes, intersect a given area. |
| SetCompressionMode | This function sets the compression mode used when this object is serialized using IPersistStream::Save function. |

IStrokeCollect

The IStrokeCollect interface may be used to collect packets into a stroke. Supports the notion of adding ink to several strokes at the same time.

This interface supports the following features:

Methods in Vtable Order

| | Description |
|---|---|
| Iunknown Methods | |
| QueryInterface | Returns pointers to supported interfaces. |
| AddRef | Increments reference count |
| Release Methods | Decrements reference count. |
| BeginStroke | This function is called to start the collection of a new stroke. Typically this function is called when the pen enters the proximity of the tablet or when it touches the tablet surface. Two or more strokes can be collected at the same time, provided that they correspond to distinct cursor identifiers. The stroke index is valid until EndStroke is called for the CID. |
| AppendPackets | Add the specified packet to the stroke being constructed. |
| EndStroke | Call this function when all packets have been added to the stroke (usually called on a cursor up). |

IIPersistStream

Derived from standard COM IPersist interface. It has four methods:

Methods in Vtable Order

| | Description |
|---|---|
| Iunknown Methods | |
| QueryInterface | Returns pointers to supported interfaces. |
| AddRef | Increments reference count. |
| Release Methods | Decrements reference count. |
| IPersistStream::IsDirty | Tells whether object changed since it was last saved. |
| IPersistStream::Load | Loads the object |
| IPersistStream::Save | Saves the object and optionally clears the dirty flag. |
| IPersistStream::GetSizeMax | Compute the size of stream needed to store the whole object in the stream. That is the size after any compression. |

ITransformInk

This interface is used to perform simple geometric transformations on the ink object. This interface supports the following features:

Methods in Vtable Order

| | Description |
|---|---|
| Iunknown Methods | |
| QueryInterface | Returns pointers to supported interfaces. |
| AddRef | Increments reference count. |
| Release Methods | Decrements reference count. |
| ITransformInk::TranslateInk | Translate a subset of strokes of an ink object by a specified x and y amount. |
| ITransformInk::ScaleInk | Scale a subset of strokes of an ink object by a specified amount. |
| ITransformInk::RotateInk | Rotate a subset of strokes of an ink object by a specified amount. |
| ITransformInk::TransformInk | Apply a linear transform to a subset of strokes of an ink object. |
| ITransformInk::FitInkToRectangle | Scale and translate ink coordinates so that ink's bounding box is as specified. |

IRenderInk

This is the interface to Ink Rendering Services. It includes functions for drawing and measuring the ink output. The measuring functions closely parallel drawing functions. This interface supports the following features:

Methods in Vtable Order

| | Description |
|---|---|
| Iunknown Methods | |
| QueryInterface | Returns pointers to supported interfaces. |
| AddRef | Increments reference count. |
| Release Methods | Decrements reference count. |
| IRenderInk::DrawInkSimple | Function used to draw the ink object. The ink is drawn in its natural aspect ratio, i.e. as it is drawn on the tablet, only it is scaled to fit the specified height on the display and placed relative to the origin parameter as specified by an alignment parameter. The origin is placed along the sides of the resulting bounding box of the ink as specified by the ink alignment values in the alignment parameter. |
| IRenderInk::DrawInk | Transforms the coordinates in the ink object to the GDI logical coordinates that all GDI drawing routines take as an input |
| IRenderInk::DrawInkInRectangle | Draws a selected rectangular area in the ink space in a prescribed rectangular area in the GDI logical space. |
| IRenderInk::MeasureInkSimple | Returns the logical ink coordinates of the bounding box in the application provided buffer. Returns the width given the height of the ink, and takes into account the width of the pen. When ink height is specified in absolute units (e.g., in points), the result is returned in hdc logical units. In this case, hdc needs to be passed to a function for conversion between physical units to logical hdc units. |

-continued

| | Description |
|---|---|
| IRenderInk::MeasureInk | This function returns the bounding box of an ink when ink is drawn with a certain transform. Takes into account drawing attributes that apply to the strokes, such as the pen width, curve fitting etc. Pressure and angles may be taken into account and when ink is drawn with curve fitting. |

ITrimInk

This interface is used to filter out the information from the ink object that is not needed or desired by a given application. For instance, removing collinear points will result in the same drawing output, assuming pressure and other packet properties are not taken into account. This interface supports the following features:

Methods in Vtable Order

| | Description |
|---|---|
| Iunknown Methods | |
| QueryInterface | Returns pointers to supported interfaces. |
| AddRef | Increments reference count. |
| Release | Decrements reference count. |
| Methods | |
| ITrimInk::RemoveCollinearPoints | This function removes all packet data associated with collinear points. |
| ITrimInk::DeleteEraserStrokes | Removes eraser data. |
| ITrimInk::DeletePenUpStrokes | Removes pen up data. |
| ITrimInk::DeletePacketPropertyData | This function removes data for the specified packet property from all ink packets in this ink object. |

What is claimed is:

1. A computer-readable medium having stored thereon a data structure, comprising,
    a data field including electronic ink data;
    at least one interface for invoking functionality associated with the data structure, including functionality for rendering a representation of the electronic ink data;
    the functionality invoked via the interface by executable code hosting a document containing the data structure, to render a representation of the electronic ink data relative to other information contained in the document; and
    at least one other data field that maintains color information related to a color of the electronic ink data, and further comprising other functionality associated with the data structure to enable the executable code to modify the color information.

2. The data structure of claim 1 further comprising, other functionality for matching the appearance of the representation to the other information contained in the document.

3. The data structure of claim 1 wherein the other information contained in the document comprises text data, and further comprising, at least one other data field in the data structure for maintaining adjustment information for adjusting the representation to match the text data, and other functionality associated with the data structure for adjusting the representation based on the adjustment information to match the text data.

4. The data structure of claim 3 wherein the at least one other field contains baseline data, and wherein the functionality adjusts the representation to match the text data by evaluating the baseline information.

5. The data structure of claim 3 wherein the at least one other field contains midline data, and wherein the functionality adjusts the representation to match the text data by evaluating the midline information.

6. The data structure of claim 1 further comprising, at least one other data field that maintains identifier information of another object.

7. The data structure of claim 1 further comprising, at least one other data field that maintains information related to normalization of the electronic ink data.

8. The data structure of claim 1 further comprising, at least one other data field that maintains information related to formatting the electronic ink data, and further comprising other functionality associated with the data structure to enable the executable code to modify the information related to formatting the electronic ink data.

9. The data structure of claim 1 further comprising, at least one other data field that maintains size information related to a displayed size of the electronic ink data, and further comprising other functionality associated with the data structure to enable the executable code to modify the size information.

10. The data structure of claim 1 further comprising, at least one other data field that maintains recognition information related to recognition of the electronic ink data by a recognition engine.

11. The data structure of claim 10 wherein the at least one other field contains recognition state information.

12. The data structure of claim 10 wherein the at least one other field contains a result from the recognition engine.

13. The data structure of claim 12 wherein the result from the recognition engine includes at least one candidate corresponding to the electronic ink data.

14. The data structure of claim 13 further comprising other functionality associated with the data structure to enable the executable code to obtain information about the at least one candidate.

* * * * *

UNITED STATES PATENT AND TRADEMARK OFFICE
CERTIFICATE OF CORRECTION

PATENT NO. : 7,039,234 B2
APPLICATION NO. : 09/909416
DATED : May 2, 2006
INVENTOR(S) : Erik M. Geidl et al.

It is certified that error appears in the above-identified patent and that said Letters Patent is hereby corrected as shown below:

In column 7, line 39, delete "$214_1\text{-}214_m$" and insert -- $214_1\text{-}214_m$ --, therefor.

In column 12, line 57, delete "metafile" and insert -- Metafile --, therefor.

In column 13, line 29, delete "words," and insert -- words --, therefor.

In column 14, line 46, delete "UNIT" and insert -- UINT --, therefor.

In column 15, line 9, after "object" insert -- . --.

In column 18, line 41, after "set" insert -- . --.

In column 18, line 42, after "set" insert -- . --.

In column 19, line 32, after "count" insert -- . --.

In column 19, line 62, after "object" insert -- . --.

In column 20, line 56, after "input" insert -- . --.

Signed and Sealed this

Thirtieth Day of March, 2010

David J. Kappos
*Director of the United States Patent and Trademark Office*